US011139896B2

(12) United States Patent
Arikawa et al.

(10) Patent No.: US 11,139,896 B2
(45) Date of Patent: Oct. 5, 2021

(54) SIGNAL PROCESSING DEVICE AND SIGNAL PROCESSING METHOD

(71) Applicant: NEC CORPORATION, Tokyo (JP)

(72) Inventors: Manabu Arikawa, Tokyo (JP); Yasunori Futatsugi, Tokyo (JP); Toshiharu Ito, Tokyo (JP)

(73) Assignee: NEC CORPORATION, Tokyo (JP)

( * ) Notice: Subject to any disclaimer, the term of this patent is extended or adjusted under 35 U.S.C. 154(b) by 95 days.

(21) Appl. No.: 16/498,138

(22) PCT Filed: Mar. 22, 2018

(86) PCT No.: PCT/JP2018/011481
§ 371 (c)(1),
(2) Date: Sep. 26, 2019

(87) PCT Pub. No.: WO2018/180912
PCT Pub. Date: Oct. 4, 2018

(65) Prior Publication Data
US 2021/0083779 A1   Mar. 18, 2021

(30) Foreign Application Priority Data
Mar. 28, 2017   (JP) .............................. JP2017-062907

(51) Int. Cl.
H04B 10/06   (2006.01)
H04B 10/61   (2013.01)
H04B 7/08   (2006.01)

(52) U.S. Cl.
CPC ............. *H04B 10/613* (2013.01); *H04B 7/08* (2013.01); *H04B 10/614* (2013.01); *H04B 10/6165* (2013.01)

(58) Field of Classification Search
CPC .. H04B 10/613; H04B 10/614; H04B 10/616; H04B 10/6165; H04B 10/112;
(Continued)

(56) References Cited

U.S. PATENT DOCUMENTS 9,998,221 B2 * 6/2018 Boroson ............ H04B 7/18513
2002/0044723 A1 4/2002 Hironishi
(Continued)

FOREIGN PATENT DOCUMENTS

JP 2002-077051 A 3/2002
JP 2009-094688 A 4/2009
(Continued)

OTHER PUBLICATIONS

D. J. Geisler et al., "Multi-Aperture Digital Coherent Combining for Free-Space Optical Communication Receivers", Opt. Express 24, 2016, pp. 12661-12671, 11 pages total.
Hosokawa et al., "Free-space Optical Receiver using SDM Technique to Overcome Atmosphere Turbulence", 59th space science technology alliance lecture, 2015, 1H16, 5 pages total.
International Search Report dated Jun. 19, 2018 issued by the International Searching Authority in International application No. PCT/JP2018/011481.
(Continued)

*Primary Examiner* — Hanh Phan
(74) *Attorney, Agent, or Firm* — Sughrue Mion, PLLC

(57) ABSTRACT

A signal processing device combines a plurality of received signals, and includes: a phase reference signal selection means for selecting a signal serving as a phase reference from among the plurality of received signals on the basis of the quality of the plurality of received signals; a relative phase calculation means for obtaining information about the relative phases of the plurality of received signals before the combining; a phase compensation means for performing relative phase compensation on each of the plurality of received signals on the basis of the relative phases; and a phase correction means for calculating a phase correction amount based on the relative phase information and performing phase correction on the received signals, wherein when switching occurs in the selected phase reference signal, the phase correction amount is changed by as much as the relative phase difference between the phase reference signals before and after the switching.

11 Claims, 12 Drawing Sheets

(58) Field of Classification Search
CPC .............. H04B 10/1123; H04B 10/114; H04B 10/1143; H04B 10/1149; H04B 10/40; H04J 14/04
USPC ....... 398/202, 208, 209, 204, 205, 118, 119, 398/124, 125, 127, 128, 129, 130, 131, 398/135, 136, 44, 158, 159
See application file for complete search history.

(56) References Cited

U.S. PATENT DOCUMENTS

| | | | |
|---|---|---|---|
| 2012/0008961 A1* | 1/2012 | Chen ................... | H04B 10/613 398/119 |
| 2014/0348277 A1 | 11/2014 | Rydström et al. | |
| 2017/0264365 A1* | 9/2017 | Takahashi .......... | H04B 10/2581 |

FOREIGN PATENT DOCUMENTS

| | | |
|---|---|---|
| JP | 2013-055559 A | 3/2013 |
| JP | 2013-535871 A | 9/2013 |
| JP | 2014-017678 A | 1/2014 |
| JP | 2015-065516 A | 4/2015 |

OTHER PUBLICATIONS

Written Opinion dated Jun. 19, 2018 issued by the International Searching Authority in International application No. PCT/JP2018/011481.

\* cited by examiner

SIGNAL PROCESSING DEVICE AND SIGNAL PROCESSING METHOD

CROSS REFERENCE TO RELATED APPLICATIONS

This application is a National Stage of International Application No. PCT/JP2018/011481, filed Mar. 22, 2018, claiming priority to Japanese Patent Application No. 2017-062907, filed Mar. 28, 2017, the contents of all of which are incorporated herein by reference in their entirety.

TECHNICAL FIELD

The present invention relates to a signal processing device and a signal processing method, and more particularly, to a signal processing device and a signal processing method, which are used for optical space communication.

BACKGROUND ART

With an increase in the expectation of the use of data obtained by observing the earth from a flying object in the sky such as an artificial satellite, it is important to increase the capacity of a communication system that transmits the observation data to the ground. In microwave communication used up to now, since there is a great legal and physical restriction in bandwidth usage and there is a limit to meet an increase in the capacity, attentions have been paid to optical space communication in which there is no actual band limit and a large capacity can be achieved. Since the optical space communication uses light having a wavelength shorter than that of a microwave and high directivity, it is possible to expect miniaturization and lightness of a transceiver.

When high speed optical communication is performed, most of available wideband receivers basically use a single mode optical fiber (SMF). Consequently, in order to achieve high speed optical space communication such as between an artificial satellite and the ground, optical signals propagated through the air after being sent from the artificial satellite or the like need to be coupled to the SMF. However, since the SMF generally used has a small core diameter of about 10 µm, when beams propagated through the space are affected by the disturbance of a wave surface due to atmospheric fluctuations, coupling efficiency to the fiber may be considerably changed or reduced.

One promising approach for solving the influence due to the atmospheric fluctuations is to use a diversity receiving system using a plurality of receivers. When the influence of the received atmospheric fluctuations is independent of each optical signal inputted to each receiver, the best one of the plurality of receivers is selected or a plurality of received signals are combined more generally, so that considerable reduction in the coupling efficiency to the fiber due to the atmospheric fluctuations is probabilistically avoided.

FIG. 9 is a block diagram illustrating a configuration of a space diversity type optical space communication receiver which is reported in Non Patent Literature 1 (NPL1) and is supposed to receive optical signals by using a plurality of telescopes and combine the optical signals by digital signal processing. The optical space communication receiver of FIG. 9 includes coherent receivers 201, A/D converters (ADC) 203, a local oscillator (LO) 202, and a digital signal processing unit 204. In the optical space communication receiver of FIG. 9, optical beams sent from an artificial satellite or the like are coupled to a SMF by using the plurality of telescopes. The optical signals coupled to the SMF are received in the coherent receivers 201, and are coherently combined by the digital signal processing unit 204. When the plurality of telescopes are within the divergence of the received optical beams and are spaced apart to be regarded to have no correlation with the influence of atmospheric fluctuations to the light inputted to the telescopes, the influence of the atmospheric fluctuations to a signal after combining is reduced by the diversity effect.

FIG. 10 is a block diagram illustrating a configuration of a mode diversity type optical space communication receiver which is reported in Non Patent Literature 2 (NPL2) and collects optical beams on a few-mode fiber having a plurality of propagation modes and combines the optical signals by digital signal processing. The optical space communication receiver of FIG. 10 includes a few-mode fiber 300, a mode demultiplexer 305, coherent receivers 301, A/D converters (ADC) 303, a local oscillator (LO) 302, and a digital signal processing unit 304. In the optical space communication receiver of FIG. 10, an optical signal coupled to each propagation mode of the few-mode fiber 300 is separated by the mode demultiplexer 305 and combined after being coherently received. In a configuration using the mode diversity, since a plurality of received signals are obtained using one telescope, the miniaturization of the receiver is expected.

FIG. 11 illustrates an example of a configuration of a digital signal processing unit when a plurality of received signals are combined at a maximum ratio. The digital signal processing unit of FIG. 11 includes reception device characteristic compensation units 311, a relative delay compensation unit 312, a relative phase compensation unit 313, a maximum ratio combining unit 314, an equalization filter 315, a carrier phase compensation unit 316, an SNR estimation unit 317, and a weighting determination unit 318.

In the coherent combining of these diversity reception systems, it is necessary to compensate for relative phases between the plurality of received signals and align phase relations. FIG. 12 illustrates a block diagram of a digital signal processing unit for compensating for relative phases between a plurality of received signals. The digital signal processing unit of FIG. 12 includes a phase reference signal selection unit 321, relative phase estimation units 322, and phase compensation units 323. The relative phase estimation unit 322 includes a complex conjugate unit 322a, a multiplier 322b, an averaging unit 322c, and an argument calculation unit 322d. First, the phase reference signal selection unit 321 selects a specific signal serving as a relative phase reference from the plurality of received signals. In general, in the selection of the specific signal serving as the relative phase reference, a signal with the best quality is selected by referring to a signal quality measure such as a signal-to-noise ratio (SNR).

The relative phase estimation unit 322 estimates a relative phase. The complex conjugate unit 322a extracts the complex conjugate of the phase reference signal selected by the phase reference signal selection unit 321, the multiplier 322b calculates the product of the complex conjugate of the phase reference signal and a received signal, and the averaging unit 322c averages the output of the multiplier 322b over a certain number of samples. Moreover, the argument calculation unit 322d takes the argument of output of the averaging unit 322c. By so doing, the relative phase estimation unit 322 estimates the relative phase of the received signal to the phase reference signal. When the phase of the received signal is compensated for by as much as the relative phase difference, the phase reference signal and the phase are aligned, so that appropriate coherent combining is possible.

Patent Literature 1 (PTL1) relates to free space optical communication and discloses that an incoming beam is separated into two or more sub-beams occupying different wavelength bands and each sub-beam is converted into an electrical signal and is processed in a digital signal processor so that an output data stream is generated.

Patent Literature 2 (PTL2) relates to an optical transmission system and discloses that a phase difference which is a component that is out of phase synchronization due to a frequency offset or the like at the time of coherent detection in an optical signal receiver is calculated by a phase synchronizer. PTL2 is a technology related to carrier phase compensation of an individual signal as seen from the fact that only one adaptive equalized signal is inputted to the phase synchronizer.

Patent Literature 3 (PTL3) relates to a receiver of facsimile broadcasting using a shortwave band and discloses that radio frequency switching is performed in order to avoid the reduction of recording quality due to the deterioration of a propagation state such as fading and a phase shift due to the radio frequency switching is corrected.

CITATION LIST

Patent Literature

[PTL1] Japanese Patent Application Laid-Open No. 2013-535871
[PTL2] Japanese Patent Application Laid-Open No. 2015-65516
[PTL3] Japanese Patent Application Laid-Open No. 2009-94688

Non Patent Literature

[NPL1] D. J. Geisler et al., "Multi-aperture digital coherent combining for free-space optical communication receivers", Opt. Express 24, pp. 12661-12671 (2016)
[NPL2] Hosokawa et al., "SDM type optical space communication technology for overcoming atmospheric fluctuations", 59th space science technology alliance lecture, 1H16 (2015)

SUMMARY OF INVENTION

Technical Problem

In the optical space communication receiver of NPL1, a received signal with the best quality is employed as a reference, a relative phase of the second received signal to the reference is calculated, compensated for, and combined, and the result is repeatedly used as a next phase reference signal. According to the relative phase compensation and coherent combining, since the quality of the phase reference signal is improved for each combining of each received signal, it is possible to reduce an error of the relative phase compensation.

However, the atmospheric conditions unexpectedly change due to various factors such as wind and weather. Therefore, in the case of diversity-receiving optical signals affected by the influence of atmospheric fluctuations, the quality of each of a plurality of received signals varies greatly for every time. In this way, since the quality of a received signal selected as a phase reference once becomes worse than those of other received signals, an error of relative phase calculation may be increased. Moreover, in a situation in which the optical power of the received signal selected as the phase reference is almost lost, since the relative phase calculation does not function at all, the received signal quality after the coherent combining may be degraded.

This problem is extremely simply solved by changing the selection of the phase reference signal over time. The selection of the phase reference signal is switched faster than a variation in the received signal quality due to the atmospheric fluctuations at a time scale sufficient for the calculation of the received signal quality, so that a received signal with the best quality can always be selected as a phase reference. However, in such a case, since switching occurs in the received signal serving as the phase reference and different phase offsets due to a propagation delay difference or the like in each receiver exist in each received signal, phase discontinuity occurs in a signal after the coherent combining. Therefore, an unacceptable continuous bit error may occur.

As described above, in the optical space communication system that connects such as between an artificial satellite and the ground, when the coherent combining of a plurality of received signals is performed employing the diversity receiving system in order to reduce the influence of the atmospheric fluctuations, it is necessary to compensate for relative phases between the received signals. Since a change in atmospheric conditions causes variation or reduction of the quality of each received signal, continuous relative phase calculation is difficult.

An object of the present invention is to provide a method for performing combining by aligning phase relations between received signals with high accuracy without causing phase discontinuity in a signal after combining, even when the quality of each of received signals varies.

Solution to Problem

To achieve the above-mentioned object, a signal processing device according to the present invention combines a plurality of received signals to be input, and comprises: a phase reference signal selection means that selects a signal serving as a phase reference from the plurality of received signals, based on the qualities of the plurality of received signals; a relative phase calculation means that obtains relative phase information between the plurality of received signals before combining; and a phase compensation means that calculates a phase correction amount based on the relative phase information and performs phase correction on the received signals, and when switching occurs in the selected phase reference signal, the phase correction amount is changed by as much as a relative phase difference between phase reference signals before and after the switching.

A signal processing method for combining a plurality of input received signals comprises: selecting a signal serving as a phase reference from the plurality of received signals, based on the qualities of the plurality of received signals; obtaining relative phase information between the plurality of received signals before combining; and calculating a phase correction amount based on the relative phase information and performing phase correction on the received signals, and when switching occurs in the selected phase reference signal, the phase correction amount is changed by as much as a relative phase difference between phase reference signals before and after the switching.

Advantageous Effects of Invention

According to the present invention, even when the quality of each of received signals varies, it is possible to perform combining by aligning phase relations between the received signals with high accuracy without causing phase discontinuity in a signal after combining.

BRIEF DESCRIPTION OF DRAWINGS (a) of FIG. 1 is a block diagram of an information processing device that performs signal processing in a diversity type optical space communication receiver of an example embodiment of a superordinate concept of the present invention and (b) of FIG. 1 is a block diagram for explaining elements of the information processing device of (a) of FIG. 1.

EXAMPLE EMBODIMENT

Preferred example embodiments of the present invention will be described in detail with reference to the drawings.

First Example Embodiment

An optical space communication receiving device and an optical space communication receiving method according to a first example embodiment of the present invention will be described.

Configuration of Example Embodiment

Figure 2:
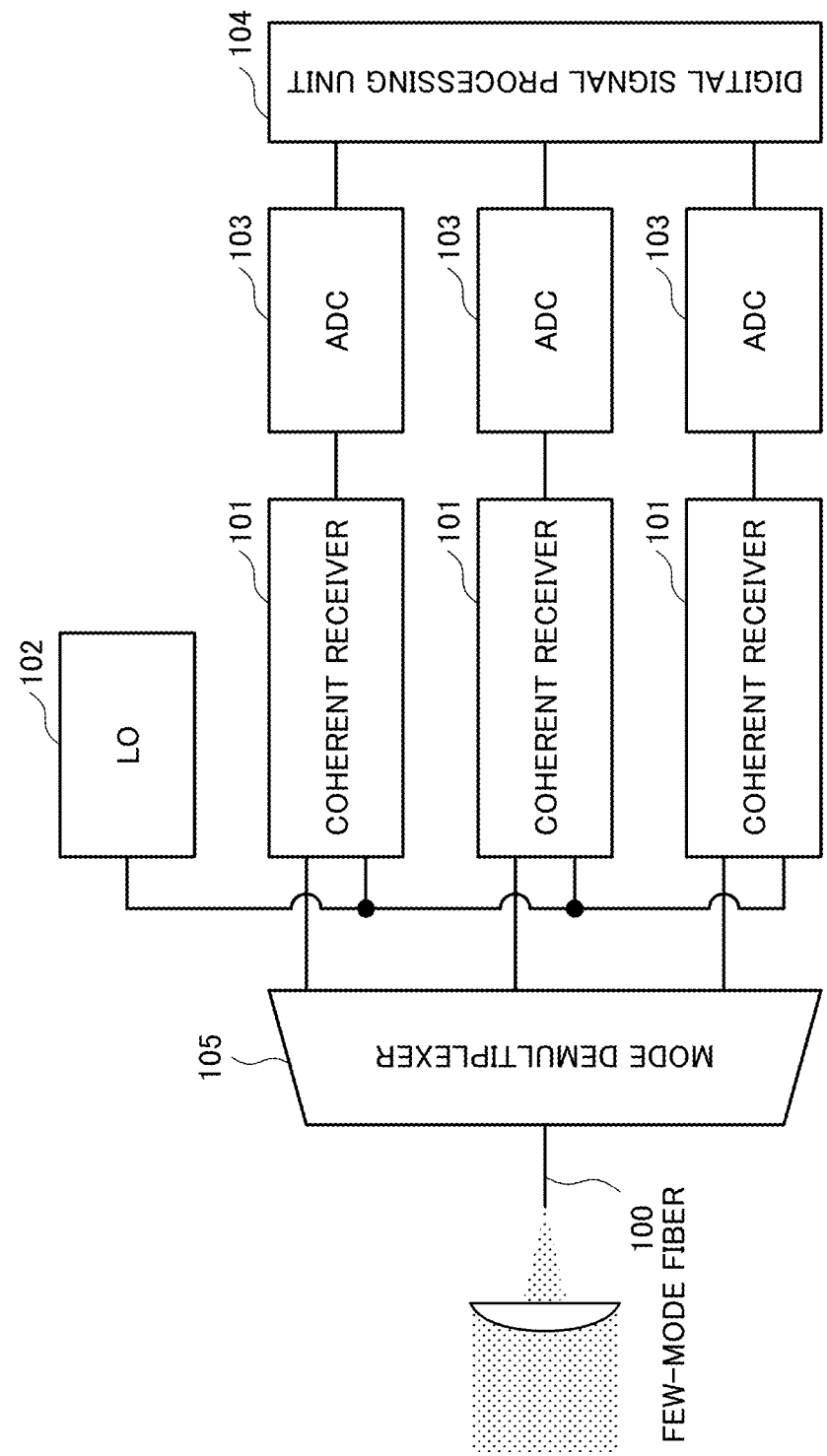
FIG. 2 is a block diagram illustrating an example of a configuration of a mode diversity type optical space communication receiver that receives a plurality of optical signals coupled to a plurality of propagation modes by using a few-mode fiber and performs combining by digital signal processing.

In a first example embodiment of the present invention, a case in which a mode diversity type optical space communication receiver of FIG. 2 is employed as an optical space communication receiving device and maximum ratio combining is performed will be described as an example.

The mode diversity type optical space communication receiver of FIG. 2 includes a few-mode fiber 100, a mode demultiplexer 105, a plurality of coherent receivers 101, a plurality of A/D converters (ADC) 103, a local oscillator (LO) 102, and a digital signal processing unit 104.

In the mode diversity type optical space communication receiver of FIG. 2, transmitted optical signals of a single polarized wave are coupled to respective propagation modes of the few-mode fiber 100 due to the influence of different atmospheric fluctuations, are separated by the mode demultiplexer 105, and then are received by the coherent receivers 101. It is assumed that the number of propagation modes of the few-mode fiber 100 is three modes, no polarization diversity is considered, and the optical signals are inputted to the respective coherent receivers 101 in the same single polarization state. A signal, which is outputted from one coherent receiver 101 and has an I (in-phase) component and a Q (quadrature) component, is expressed in the form of a complex number, received signals from the three modes are respectively sampled by the A/D converters (ADC) 103, and are inputted to the digital signal processing unit 104.

Figure 3:
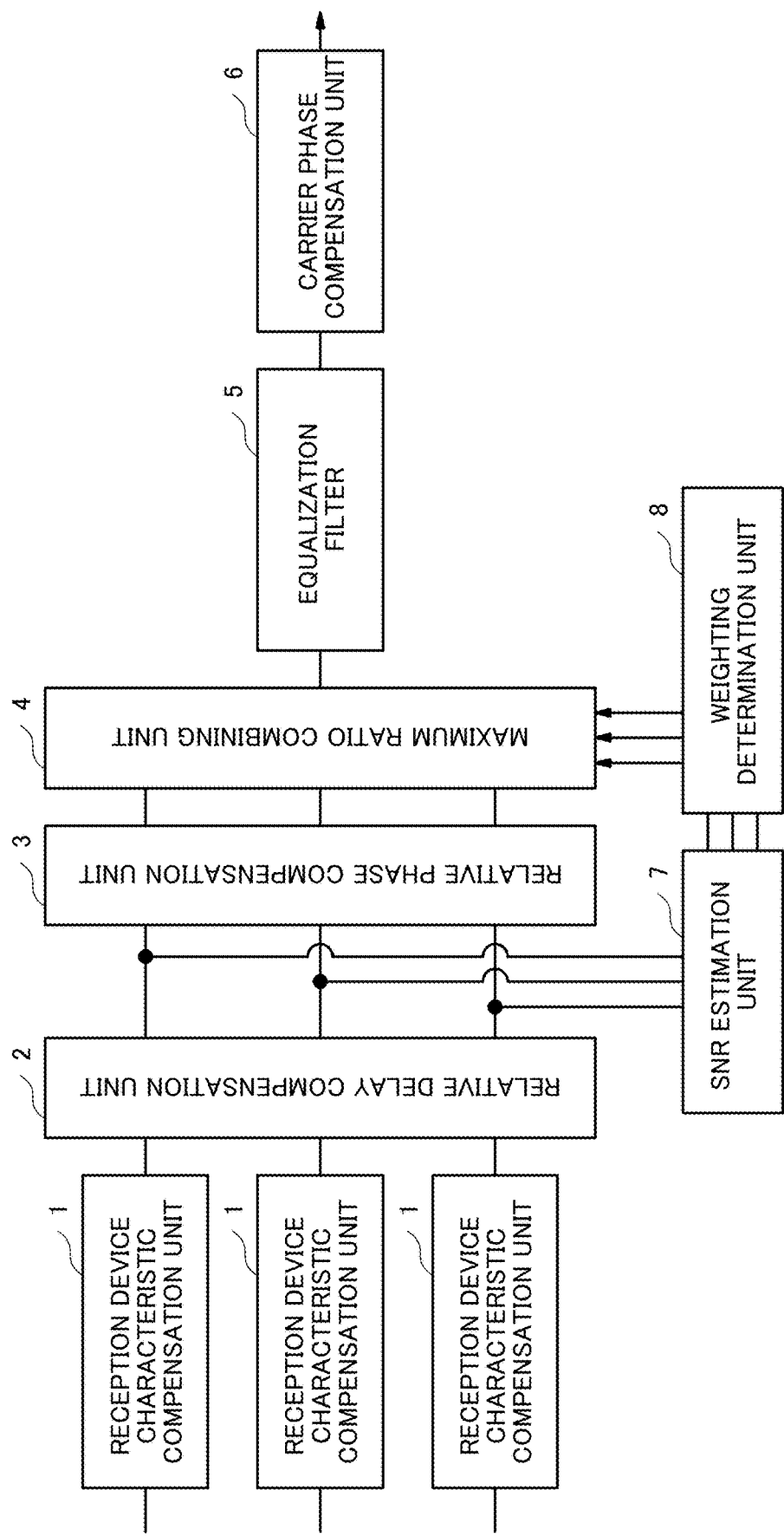
FIG. 3 is a block diagram illustrating a configuration for digital signal processing in a diversity type optical space communication receiver of a first example embodiment of the present invention.

FIG. 3 is a block diagram illustrating a configuration for diversity reception digital signal processing using a signal processing device of the first example embodiment of the present invention. The digital signal processing unit of FIG. 3 includes reception device characteristic compensation units 1, a relative delay compensation unit 2, a relative phase compensation unit 3 as an example of a relative phase estimation means, a maximum ratio combining unit 4, an equalization filter 5, a carrier phase compensation unit 6, an SNR estimation unit 7, and a weighting determination unit 8.

First, the reception device characteristic compensation units 1 of the digital signal processing unit of FIG. 3 individually perform a reception device characteristic compensation process such as IQ skew on received signals of respective modes. Then, the relative delay compensation unit 2 performs relative delay compensation between the respective received signals. The relative delay compensation is achieved by detecting and aligning known training patterns inserted in advance at a transmission side or selecting a delay amount for maximizing the magnitude of correlation between the respective received signals. Next, the relative phase compensation unit 3 performs relative phase compensation on the respective received signals. The respective received signals with the aligned phases are weighted according to a signal-to-noise ratio (SNR) and added to one another, so that maximum ratio combining is performed in the maximum ratio combining unit 4. The SNR estimation unit 7 estimates the SNRs of the respective received signals. The SNR estimation unit 7 performs a statistical process on the received signals subjected to the relative delay compensation in the relative delay compensation unit 2, thereby estimating the SNRs of the respective received signals. The SNR estimation can also be performed in other methods such as slightly tapping optical signals inputted to the coherent receivers 101 and monitoring their optical powers. The signal after combining combined by the maximum ratio combining unit 4 is subjected to carrier phase compensation in the carrier phase compensation unit 6 after the influence or the like of inter-symbol interference are removed by the equalization filter 5. Finally, reception data is obtained by decoding, error correction or the like (not illustrated).

Figure 4:
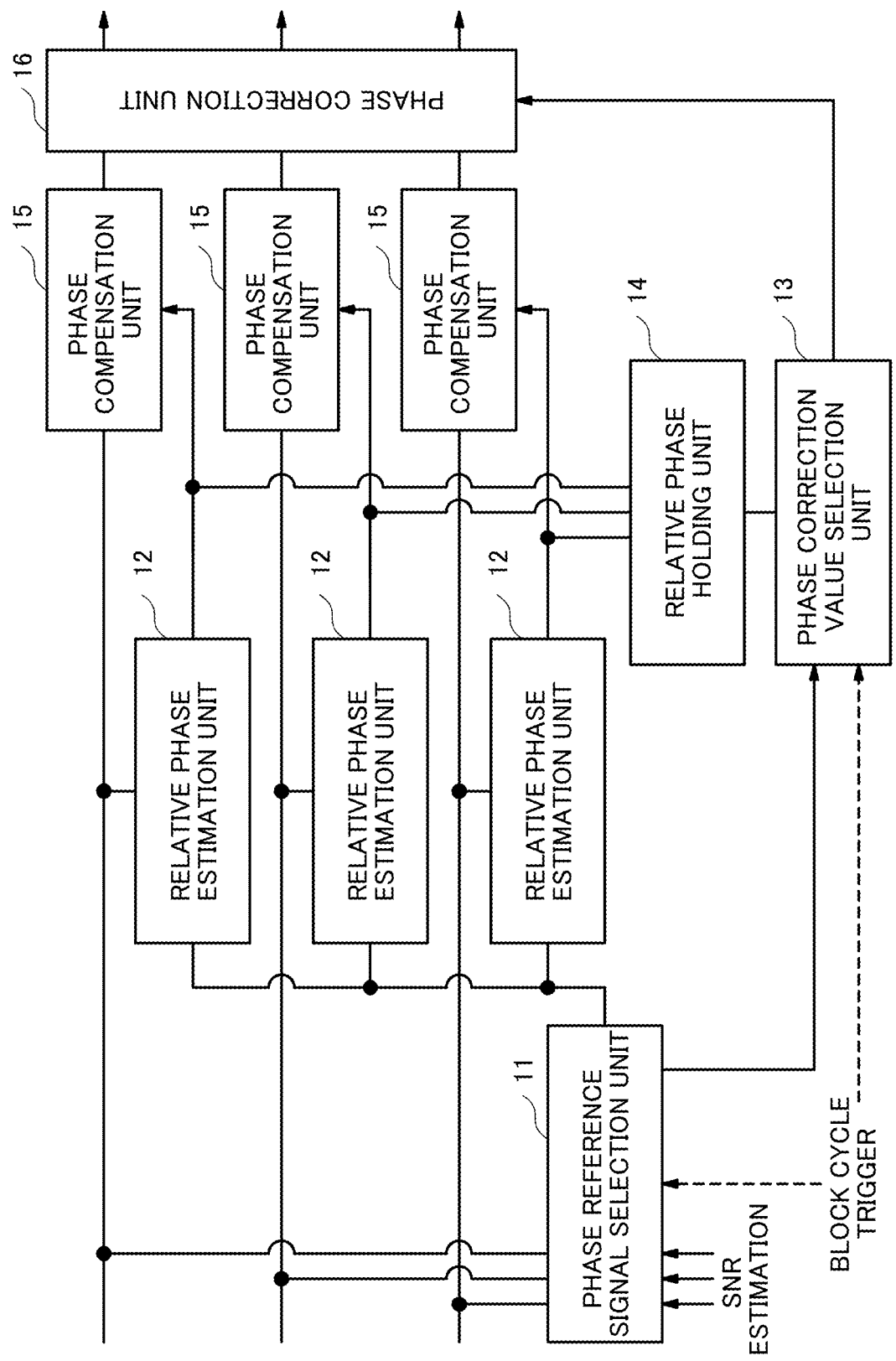
FIG. 4 is a block diagram illustrating a configuration for a relative phase compensation process in a diversity type optical space communication receiver of the first example embodiment of the present invention.

FIG. 4 is a block diagram for explaining the relative phase compensation process of the first example embodiment of the present invention. The relative phase compensation unit of FIG. 4 includes a phase reference signal selection unit 11, relative phase estimation units 12, a phase correction value selection unit 13, a relative phase holding unit 14, phase compensation units 15, and a phase correction unit 16. The phase compensation units 15 compensate for relative phases between each mode. For example, when a mode p is selected as a phase reference, an estimated relative phase $\phi_{qp}$ and a signal $E_q$ of a mode q are inputted to the phase compensation unit 15 for the signal of the mode q and $E_q \exp(-i\phi_{qp})$ is outputted therefrom. The phase correction unit 16 additionally changes a phase in order to compensate for phase discontinuity caused by switching in the selected phase reference signal. The signal $E_q \exp(-i\phi_{qp})$ of the mode q subjected to the relative phase compensation and a phase correction value $\phi_c$ are inputted to the phase correction unit 16 for the signal of the mode q, and $E_q \exp(-i\phi_{qp})\exp(-i\phi_c)$ is outputted therefrom.

Figure 12:
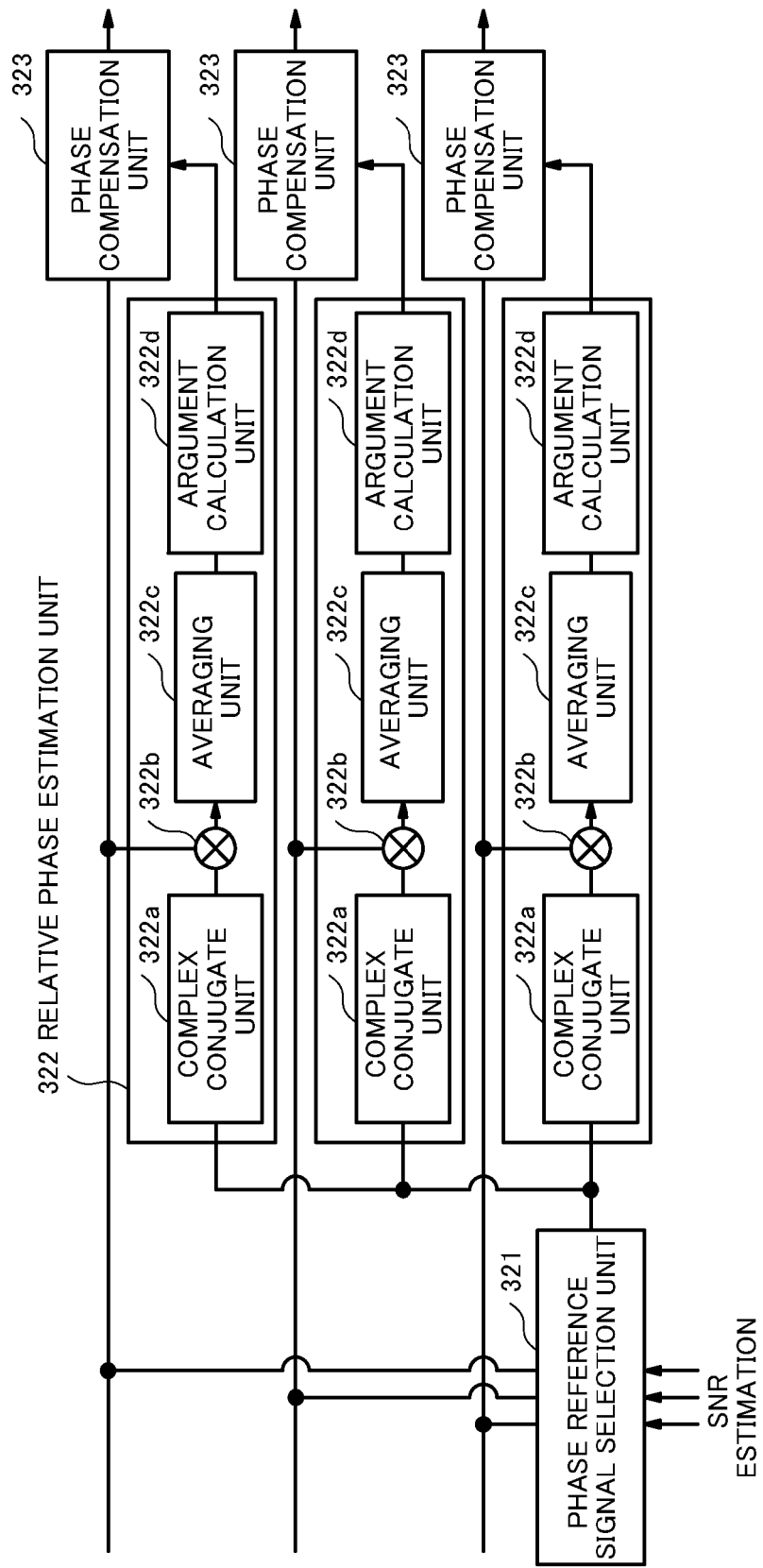
FIG. 12 is a block diagram of a relative phase compensation processing unit during digital signal processing in a diversity type optical space communication receiver of the background art.

In FIG. 4, received signals of three modes subjected to the relative delay compensation are inputted. First, based on a result of SNR estimation separately performed, the phase reference signal selection unit 11 selects a signal having a maximum SNR from these three received signals as a phase reference signal. That is, the phase reference signal selection unit 11 selects a signal with the best quality from the three received signals as the phase reference signal. The phase reference signal is inputted to the relative phase estimation units 12, so that relative phases of the respective received signals to the phase reference signal are estimated. The estimation of the relative phases is performed by averaging the product of the complex conjugate of the phase reference signal and a certain received signal over a certain number of samples and taking the argument of the averaged signal, similarly to the process in the relative phase estimation unit 322 of FIG. 12. Then, the respective received signals are compensated for the estimated relative phases. These relative phases are also inputted to the relative phase holding unit 14 and its information is stored. The phase correction value selection unit 13 determines a phase correction value from the relative phase information stored in the relative phase holding unit 14 and information on a signal selected by the phase reference signal selection unit 11 as the phase reference. The phases of all of the received signals outputted by the phase compensation unit 15 and subjected to the relative phase compensation between each mode are corrected in the phase correction unit 16 with the determined phase correction value.

The phase correction value selection unit 13 selects 0 as a phase correction value in an initial state. When switching occurs in the phase reference signal selected by the phase reference signal selection unit 11, the phase correction value selection unit 13 refers to information on relative phases between signals serving as the phase reference before and after the switching, which are stored in the relative phase holding unit 14, and adds the relative phases to the phase correction value up to that time. For example, when the signal serving as the phase reference is switched from the mode 1 to the mode 3, the relative phase holding unit 14 stores relative phases $\phi_{11}$, $\phi_{21}$, and $\phi_{31}$ based on the mode 1, and the phase correction unit 16 refers to $\phi_{31}$, which is a relative phase to the mode 3, and calculates $\phi_0+\phi_{31}$, which is the sum with $\phi_0$ as the original correction value of the phase correction unit 16, as a new phase correction value. In this way, phase discontinuity of a signal after maximum ratio combining due to switching in the signal serving as the phase reference is removed.

The selection of the phase reference signal and the monitoring of the switching in the phase reference signal of the phase correction value selection unit 13 are performed by a predetermined block cycle. As the selection of the phase reference signal is frequently performed, it is possible to select a signal with a good temporal resolution and the best quality (SNR in such a case). On the other hand, since the estimation of the qualities of the respective received signals is affected by noise, it is necessary to select the phase reference signal with a certain time width. For example, by selecting a time scale which is shorter than a variation in the received signal quality due to atmospheric fluctuations and sufficient for the calculation of the received signal quality as the block cycle, a received signal with the best quality can always be accurately selected as a phase reference.

Figure 5:
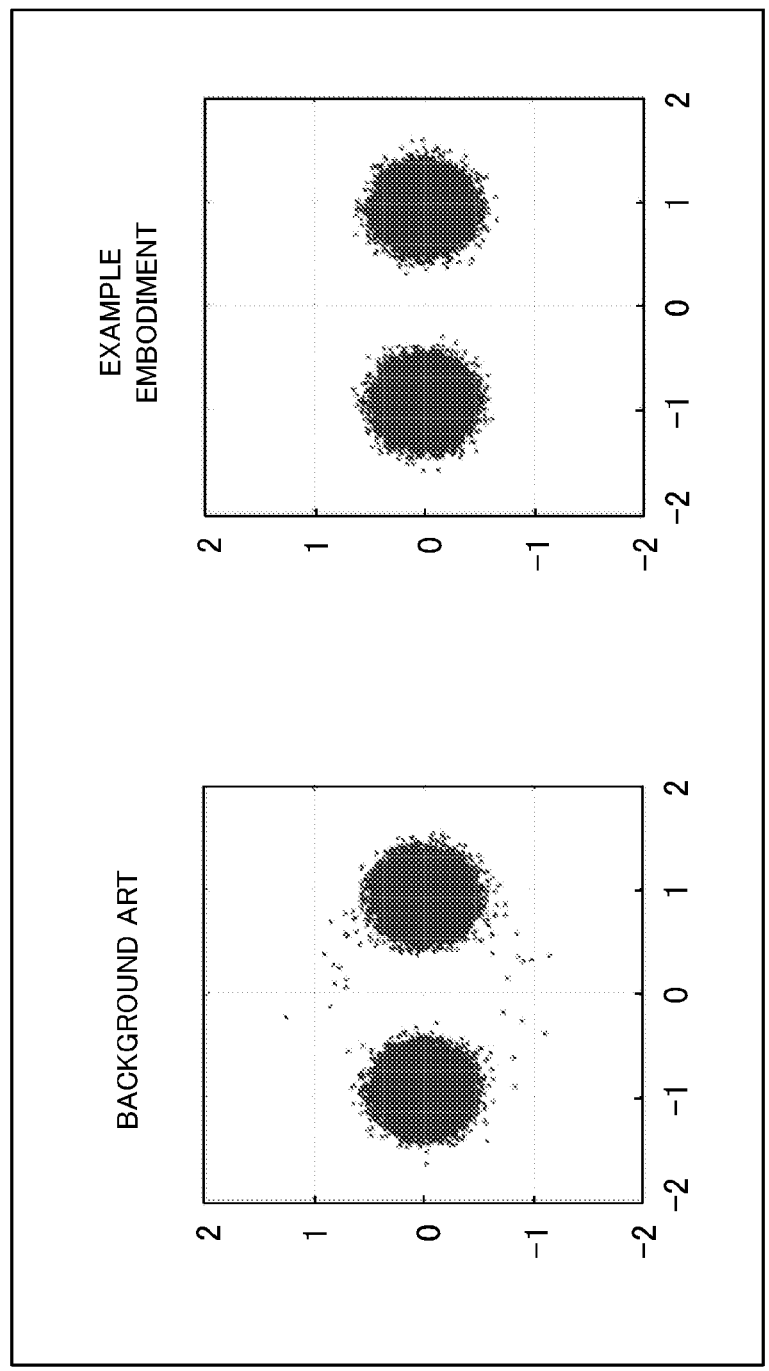
FIG. 5 is a constellation diagram of received signals after combining of the background art and an example embodiment of the present invention, which are obtained by performing simulation verification in the case of BPSK signal mode diversity reception.

The effect of the digital signal processing described above has been verified by simulation. FIG. 5 includes a constellation diagrams of received signals after combining of the background art and the example embodiment of the present invention, which are obtained by performing simulation verification in the case of BPSK signal mode diversity reception. A 10 Gb/s BPSK signal was used as a transmission signal and was received in a mode diversity type optical space communication receiver using a 3-mode few-mode fiber. A main noise source was shot noise and any differential coding was not performed. The frequency offset of local oscillator light was set to 300 MHz and a line width was set to 100 kHz. The block cycle was set to 10,000 symbols. In this simulation, an optical signal is coupled to each mode at the same optical power, but since the SNR of each received signal slightly varies with time due to the influence of random noise, a received signal with the best quality changes with time. The constellation diagram of the background art of FIG. 5 illustrates signals after combining obtained when signals as a phase reference have just changed with time.

In the case of the technique of the background art, since phase discontinuity after combining is compensated for by carrier phase compensation at a following stage, signal points are distributed around phases 0 and π expected from the BPSK signal and are also slightly distributed around phases other than the phases 0 and π. When the present technique is used, such a phenomenon does not occur.

Figure 6:
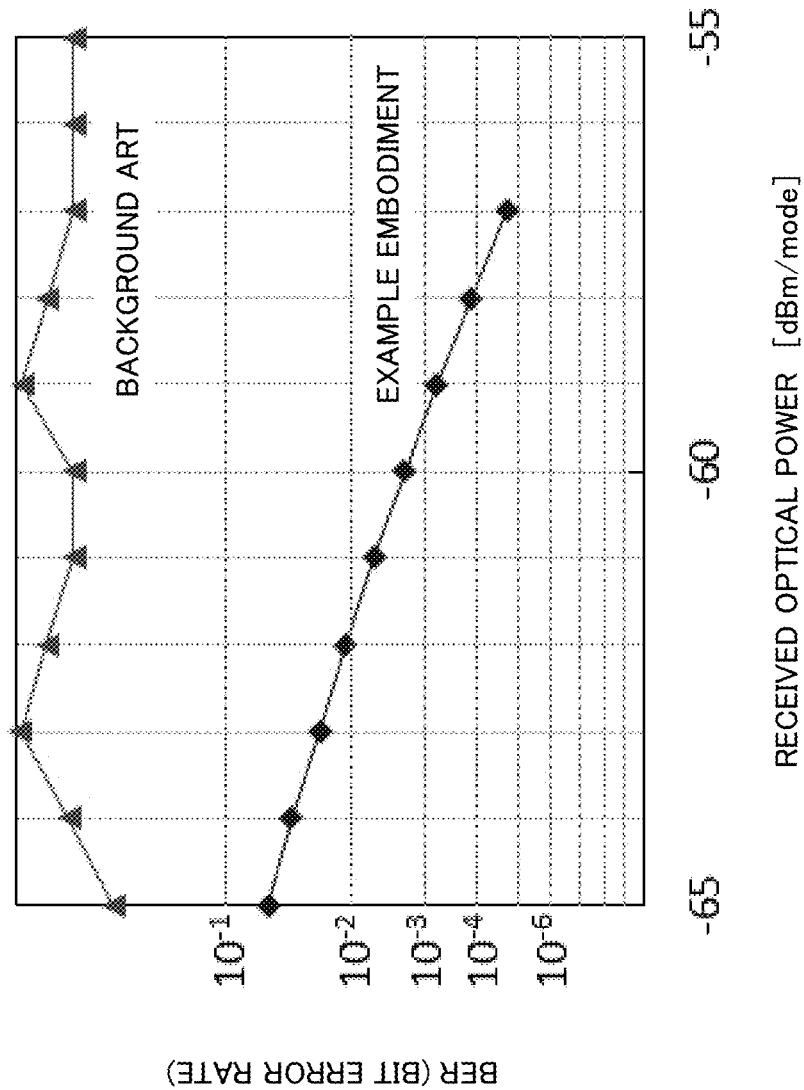
FIG. 6 is a graph illustrating a relation between received optical power and BER of an example embodiment of the present invention, which are obtained by performing simulation verification in the case of BPSK signal mode diversity reception.

FIG. 6 illustrates a simulation result of a change in a bit error rate (BER) when a received optical power per mode has changed. When the signals as the phase reference have just changed with time as in the background art, since the phase discontinuity of the signals after combining causes cycle slip, BER of $1\times10^{-1}$ or more is obtained regardless of the received optical power. On the other hand, according to the example embodiment of the present invention, it is possible to confirm that the phase discontinuity is eliminated.

Advantageous Effect of Example Embodiment

According to the optical space communication receiving device and the optical space communication receiving method of the present example embodiment, a signal with the best received signal quality is selected as a phase reference signal by the phase reference signal selection unit 11, so that phase relations between received signals are aligned with high accuracy. Furthermore, when the received signal quality varies and switching occurs in the phase reference signal, a phase discontinuity amount resulting from the switching is corrected from the relation of relative phases calculated up to that time and is eliminated. As a consequence, no phase discontinuity also occur in a signal after coherent combining.

Even when the quality of each of received signals varies due to the influence of atmospheric fluctuations, it is possible to perform coherent combining by aligning phase relations between the received signals with high accuracy without causing phase discontinuity in a signal after combining.

The contrast between PTL2 and the example embodiment of the present invention will be supplemented just to be safe. In PTL2, a phase difference, which is a component that is out of phase synchronization due to a frequency offset or the like at the time of coherent detection in an optical signal receiver, is calculated by a phase synchronizer. However, in PTL2, as seen from the fact that only one adaptive equalized signal is inputted to the phase synchronizer, this is not relative phases between a plurality of signals and a carrier phase error of individual signals is obtained. As seen from the description in PTL2 that a phase difference is corrected from the adaptive equalized signal by using the estimated phase difference and is outputted as a phase synchronization signal, this process is performed only for individual signals. On the other hand, in the example embodiment of the present invention, since a phase correction process is performed using relative phases between a plurality of signals, there is an obvious difference.

Second Example Embodiment

Next, an optical space communication receiving device and an optical space communication receiving device according to a second example embodiment of the present invention will be described.

Configuration of Example Embodiment

Also, in the present example embodiment, a case in which the mode diversity type optical space communication receiver of FIG. 2 is employed as an optical space communication receiving device and maximum ratio combining is performed, similarly to the first example embodiment, will be described as an example.

Figure 7:
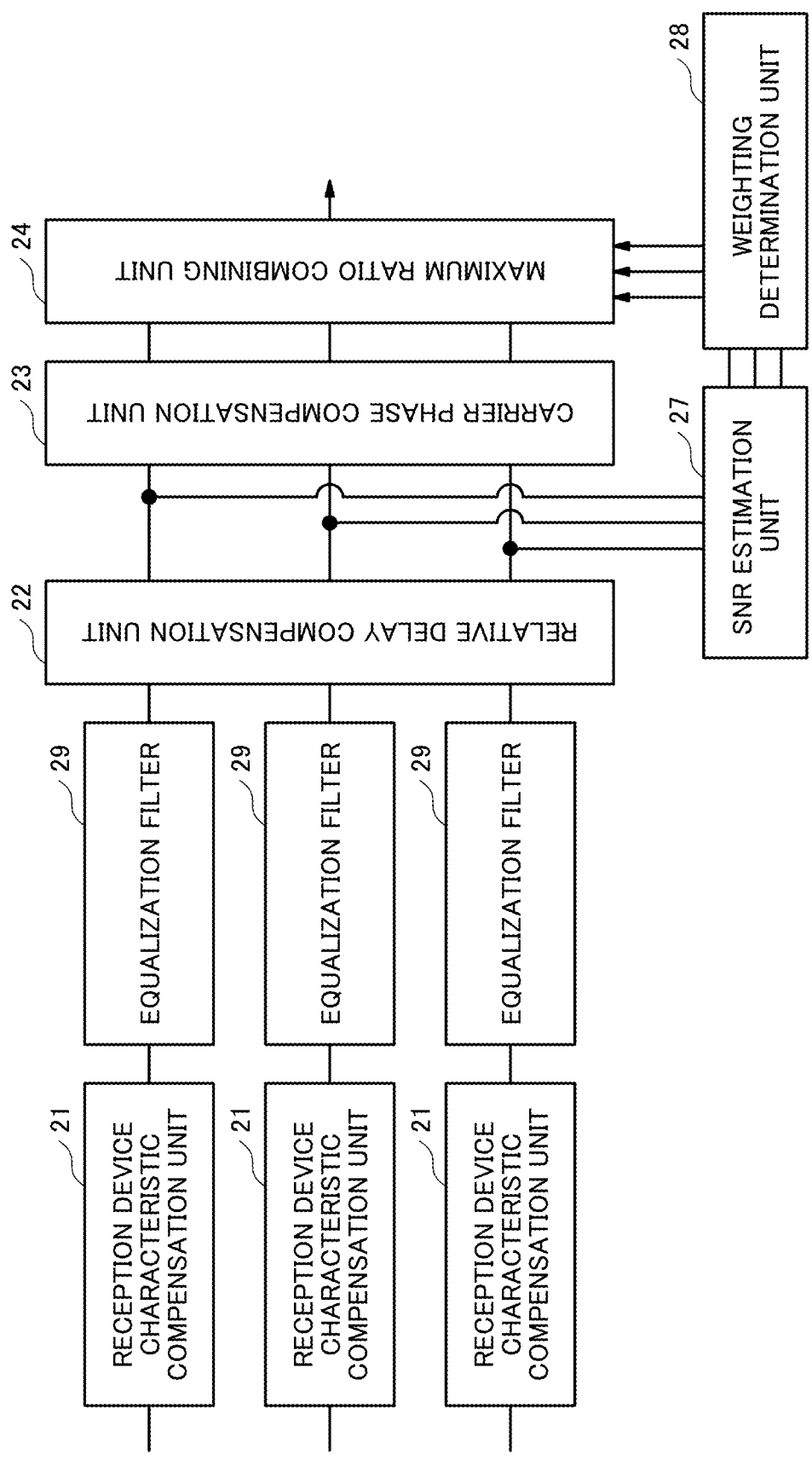
FIG. 7 is a block diagram illustrating a configuration for digital signal processing in a diversity type optical space communication receiver of a second example embodiment of the present invention.

FIG. 7 is a block diagram illustrating a configuration for diversity reception digital signal processing using a signal processing device of the second example embodiment of the present invention. Similarly to the description of the first example embodiment, it is assumed that transmitted optical signals of a single polarized wave are received in a mode diversity type optical space communication receiver using a few-mode fiber having three propagation modes.

A digital signal processing unit of FIG. 7 includes reception device characteristic compensation units 21, a relative delay compensation unit 22, a maximum ratio combining unit 24, an SNR estimation unit 27, and a weighting determination unit 28. The digital signal processing unit of FIG. 7 further includes equalization filters 29 and a carrier phase compensation unit 23. In the digital signal processing unit of FIG. 7, instead of performing the equalization filter process and the carrier phase compensation process after the maximum ratio combining process of the first example embodiment as illustrated in FIG. 5, an equalization filter process by the equalization filters 29 and a carrier phase compensation process by the carrier phase compensation unit 23 are individually performed on received signals of respective modes. In this way, the respective modes are subjected to the carrier phase compensation, so that demodulated received signals are obtained.

The SNR estimation unit 27 estimates the SNRs of the respective received signals by referring to input to the carrier phase compensation unit 23. The SNR estimation unit 27 estimates the SNRs of the respective received signals by performing a statistical process of the received signals subjected to relative delay compensation in the relative delay compensation unit 22. The SNR estimation by the SNR estimation unit 27 can be performed using these demodulation results, so that it is possible to expect the improvement of estimation accuracy. Consequently, optimal weighting at the time of maximum ratio combining is determined with high accuracy, so that it is possible to improve a received signal quality after the combining.

The respective received signals with the aligned phases are weighted according to an SNR determined by the weighting determination unit 28 and are added, so that the maximum ratio combining is performed in the maximum ratio combining unit 24. Consequently, optimal weighting at the time of the maximum ratio combining is determined with high accuracy, so that it is possible to improve the received signal quality after the combining.

As the carrier phase estimation and compensation process by the carrier phase compensation unit 23, for example, there has been known an Mth power method in which signals obtained by multiplying M-phase PSK signals by an Mth power are averaged so that the influence of noise is removed and then the argument of the averaged signal is compensated for as a carrier phase estimation value. In such a case, the influence of random noise is reduced by the averaging, but since phase noise of laser to be compensated randomly varies, it is not possible to completely remove the influence of noise by the averaging. Thus, the carrier phase estimation is affected by noise included in the received signals.

Consequently, as in the digital signal processing unit of FIG. 7, even when the carrier phase compensation process is individually performed on the received signals of respective modes, since the carrier phase estimation is not individually performed on the received signals of the respective modes but is performed on a signal with the best quality of the received signals, the carrier phase estimation value is distributed to all the received signals, and the phase compensation is performed, it is advantageous to improve the received signal quality. However, also in such a case, since it is necessary to select one phase reference from a plurality of received signals, there are problems similar to those as described above.

Figure 8:
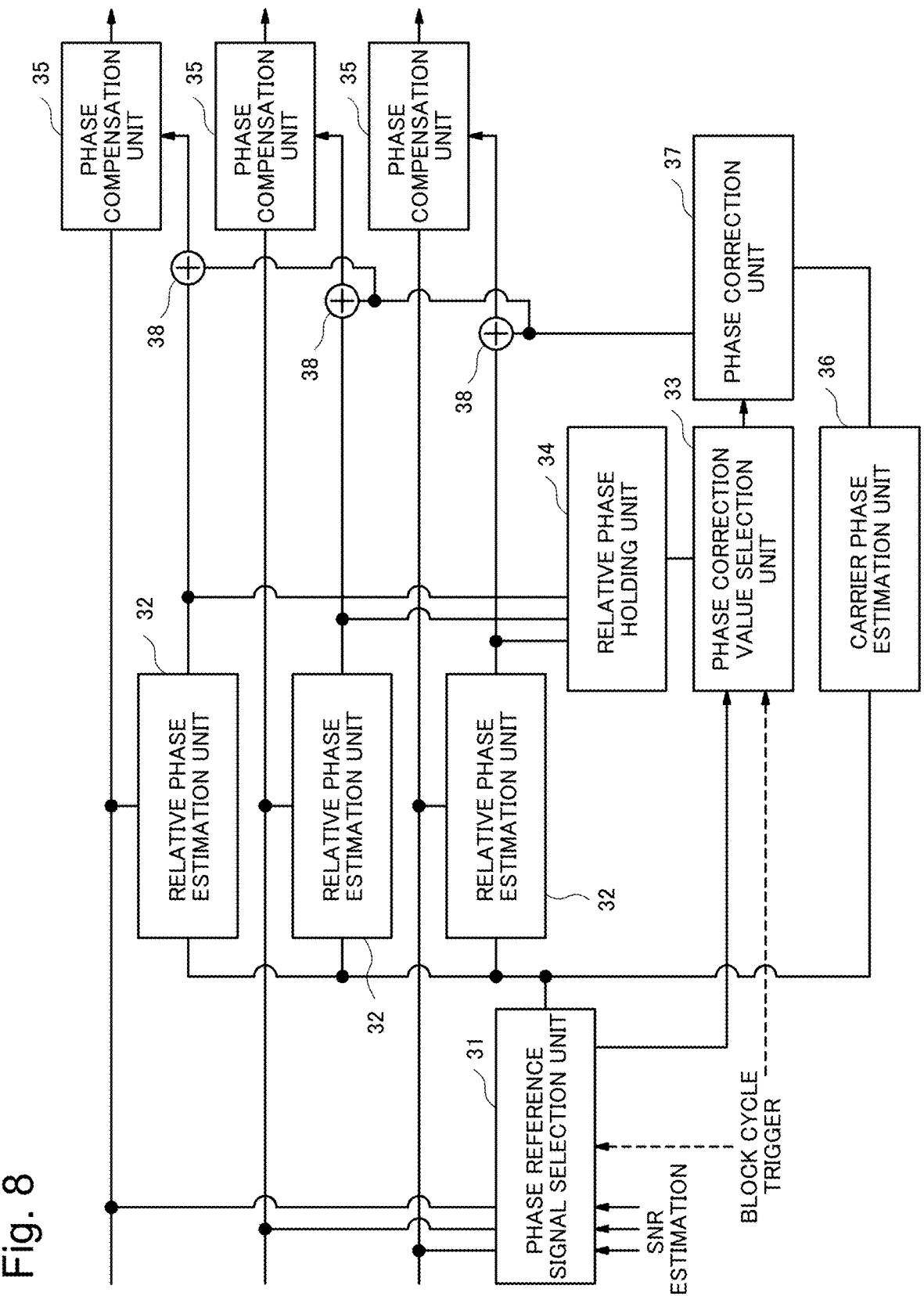
FIG. 8 is a block diagram illustrating a configuration for carrier phase compensation digital signal processing in a diversity type optical space communication receiver of the second example embodiment of the present invention.
Figure 9:
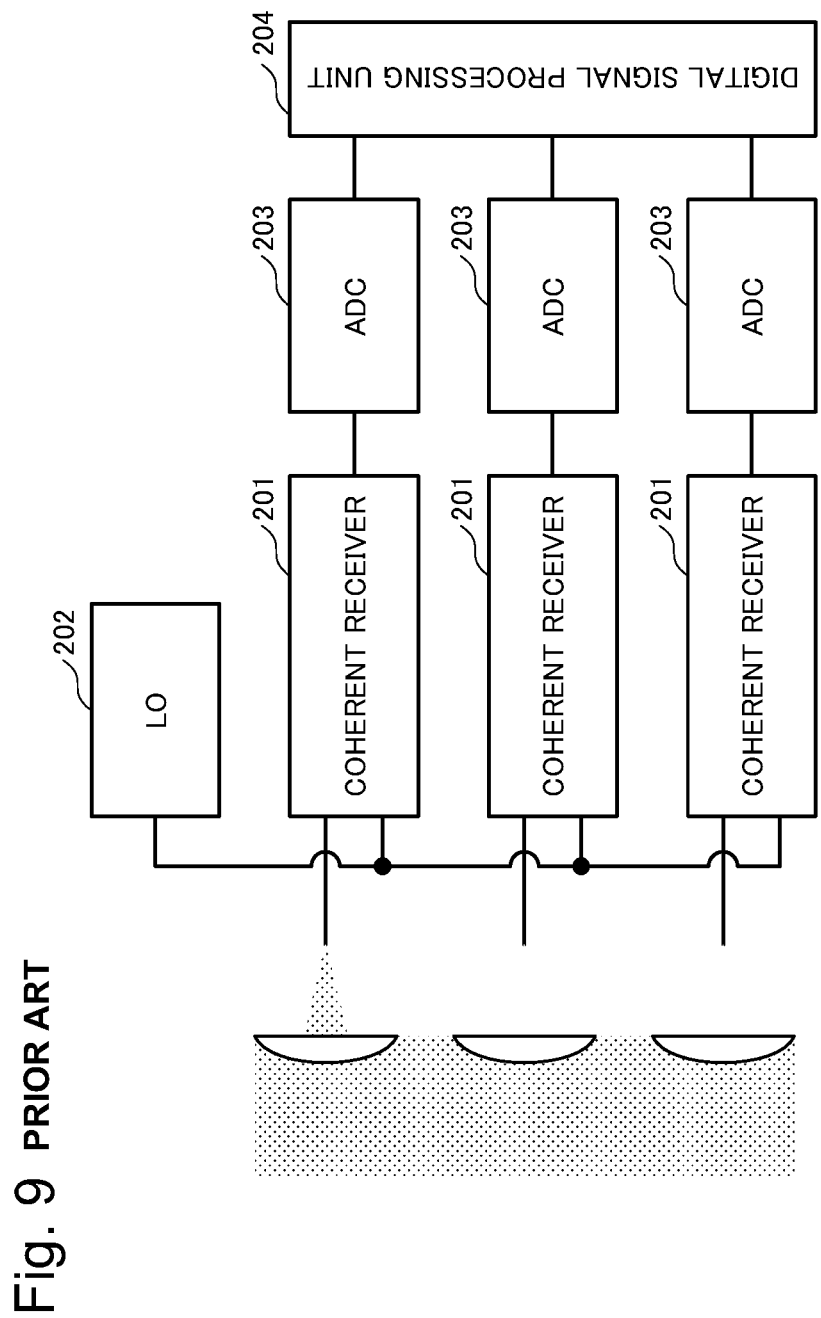
FIG. 9 is a block diagram illustrating an example of a configuration of a space diversity type optical space communication receiver of the background art, which receives optical signals by using a plurality of telescopes and performs combining by digital signal processing.
Figure 10:
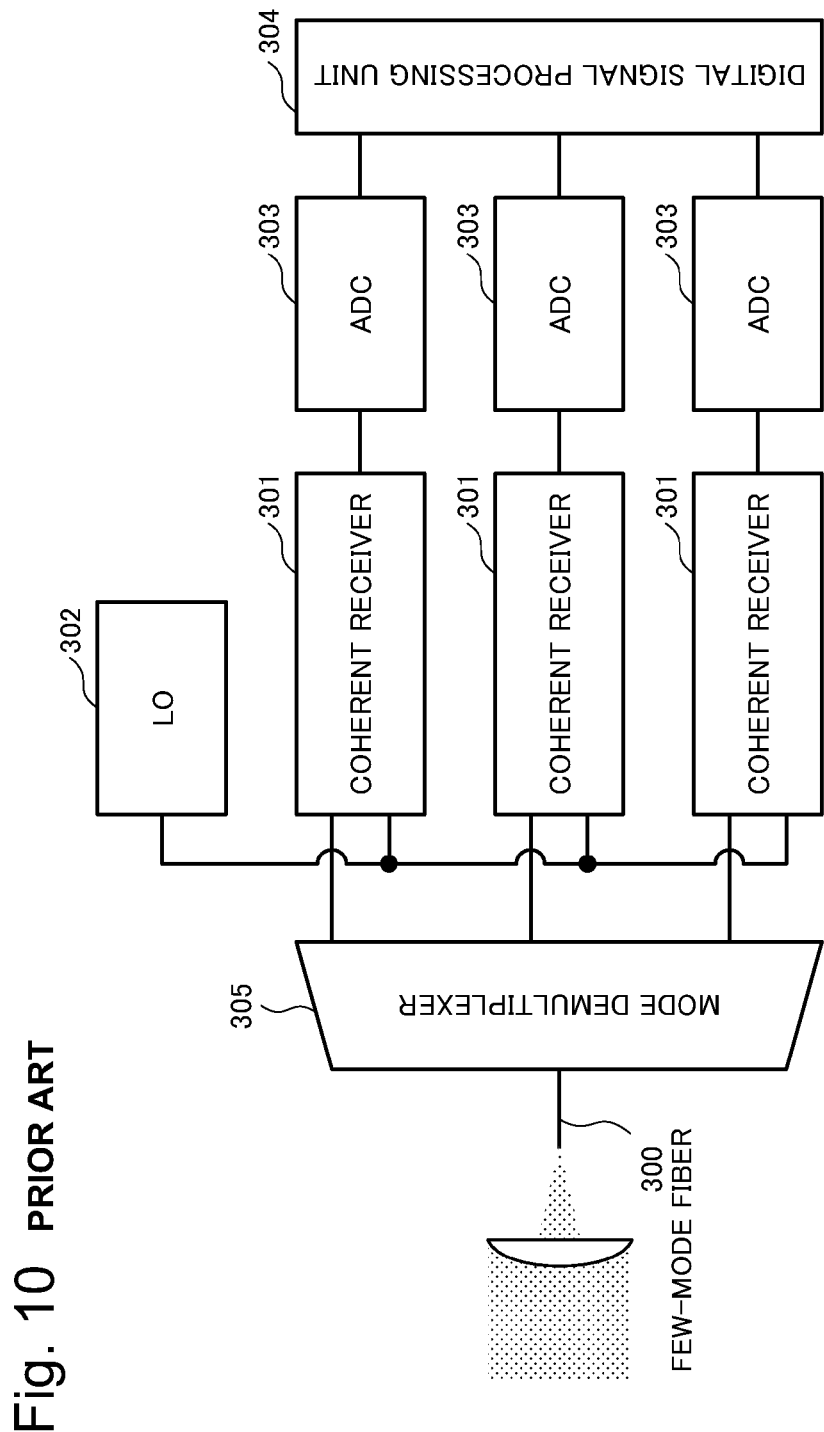
FIG. 10 is a block diagram illustrating an example of a configuration of a mode diversity type optical space communication receiver of the background art, which receives a plurality of optical signals coupled to a plurality of propagation modes by using a few-mode fiber and performs combining by digital signal processing.
Figure 11:
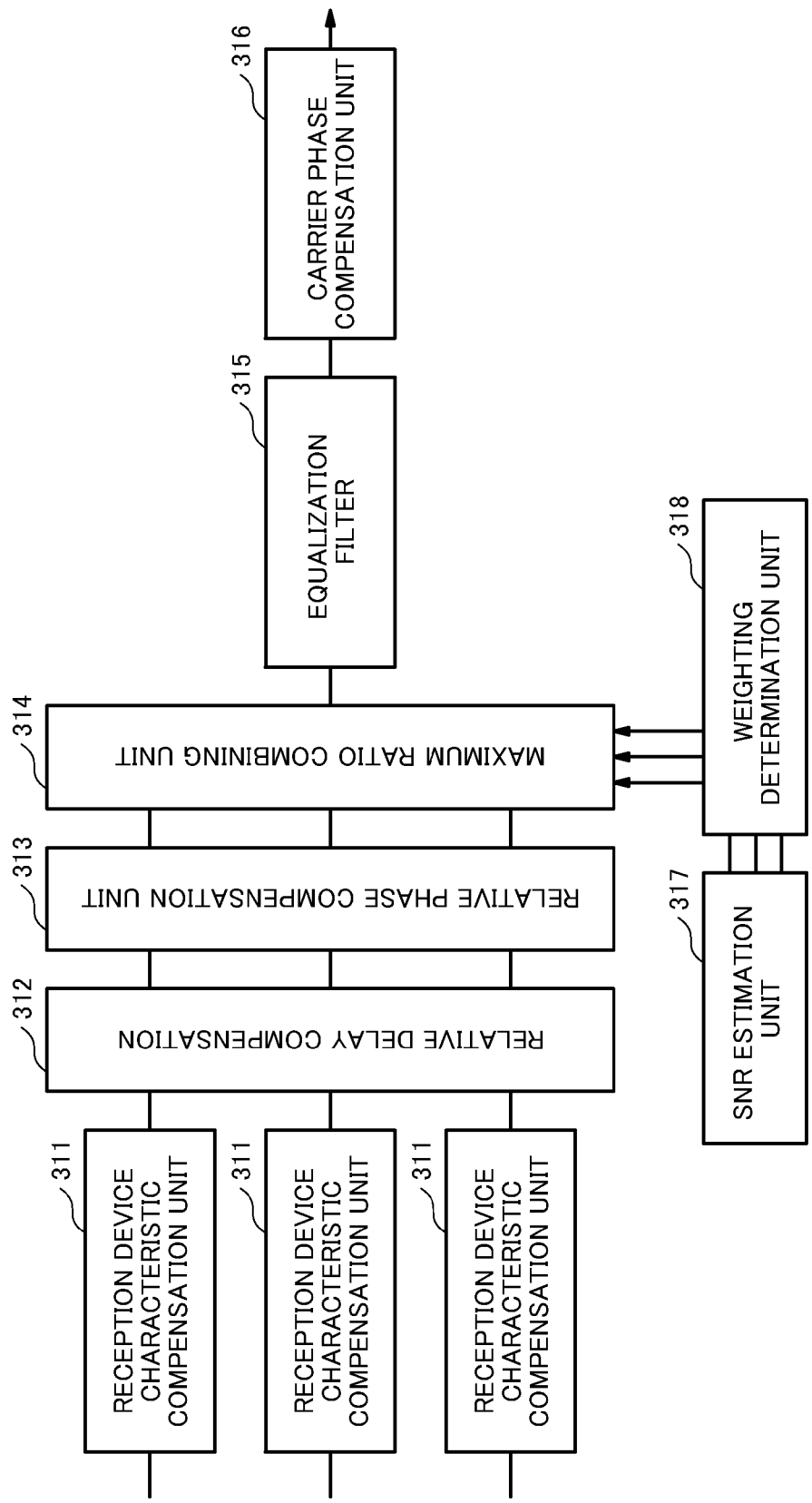
FIG. 11 is a diagram illustrating an example of a configuration of a digital signal processing unit in a diversity type optical space communication receiver of the background art.

FIG. 8 is a block diagram of the carrier phase compensation unit for aligning phase relations between the received signals of the respective modes without causing phase discontinuity in a signal after combining when the carrier phase compensation is individually performed on the received signals of the respective modes from a result obtained by performing the carrier phase estimation on a signal with the best quality. The carrier phase compensation unit of FIG. 8 includes a phase reference signal selection unit 31, relative phase estimation units 32, a phase correction value selection unit 33, a relative phase holding unit 34, phase compensation units 35, a carrier phase estimation unit 36, a phase correction unit 37, and adders 38. First, based on a result of SNR estimation separately performed, the phase reference signal selection unit 31 selects a signal having a maximum SNR from three received signals as a phase reference signal. The phase reference signal is inputted to the carrier phase estimation unit 36 and the carrier phase estimation is performed. The respective received signals are subjected to the phase compensation using the carrier phase estimation result.

The phase reference signal is further inputted to the relative phase estimation units 32. The relative phase estimation units 32 estimate relative phases of the respective received signals to the phase reference signal and output the results to the relative phase holding unit 34. For example, when a mode p is selected as a phase reference, the relative phase estimation unit 32 for the signal of a mode q estimates a relative phase $\phi_{qp}$ and outputs the estimated relative phase $\phi_{qp}$ to the relative phase holding unit 34. The relative phase holding unit 34 stores the relative phases estimated by the relative phase estimation units 32 for the signals of each mode. The phase correction value selection unit 33 determines a phase correction value from information on the relative phases, which is stored in the relative phase holding unit 34, and information on a signal selected by the phase reference signal selection unit 31 as the phase reference. The phase correction value selection unit 33 selects 0 as a phase correction value in an initial state. When switching occurs in the signal serving as the phase reference, the phase correction value selection unit 33 refers to information on relative phases between signals as the phase reference before and after the switching stored in the relative phase holding unit 34, and adds the relative phase to the phase correction value up to that time. The phase correction unit 37 corrects the phase correction value obtained by so doing to a carrier phase estimation value. The corrected carrier phase estimation value is added to the relative phase of each received signal in each adder 38 and is output to each phase compensation unit 35. The phase compensation units 35 simultaneously compensate for the relative phase between the modes and the carrier phase. By these processes, the phase discontinuity of a signal after maximum ratio combining due to switching in a signal serving as the phase reference is removed, so that it is possible to appropriately decode reception data.

Advantageous Effect of Example Embodiment

According to the optical space communication receiving device and the optical space communication receiving method of the present example embodiment, a signal with the best received signal quality is selected as a phase reference signal by the phase reference signal selection unit 31, so that phase relations between received signals are aligned with high accuracy. Furthermore, when the received signal quality varies and switching occurs in the phase reference signal, a phase discontinuity amount resulting from the switching is corrected from the relation of relative phases calculated up to that time and is eliminated. As a consequence, no phase discontinuity occurs in a signal after coherent combining, either.

Even when the quality of each of received signals varies due to the influence of atmospheric fluctuations, it is possible to perform coherent combining by aligning phase relations between the received signals with high accuracy without causing phase discontinuity in a signal after combining.

Moreover, in the present example embodiment, the equalization filter process by the equalization filters 29 and the carrier phase compensation process by the carrier phase compensation unit 23 are individually performed on received signals of respective modes. In this way, the respective modes are subjected to the carrier phase compensation, so that demodulated received signals are obtained. The SNR estimation by the SNR estimation unit 27 can be performed using these demodulation results, so that it is possible to expect the improvement of estimation accuracy. Consequently, optimal weighting at the time of maximum ratio combining is determined with high accuracy, so that it is possible to improve the received signal quality after the combining.

Other Example Embodiments

So far, although the preferred example embodiments of the present invention have been described, the present invention is not limited thereto. Various modifications can be made within the scope of the invention defined in the appended claims and it goes without saying that they are included in the scope of the present invention.

The aforementioned signal processing devices according to the first and second example embodiments of the present invention may also be implemented by an information processing device capable of executing a program for performing such configurations and operations. For example, it is also conceivable that the signal processing devices according to the example embodiments of the present invention are configured by reading the program for performing each function of the aforementioned signal processing devices to an information processing device 150 of (a) of FIG. 1 and executing the program. The program may be distributed in the form of a computer readable recording medium. The program recorded on such a recording medium is read and executed in the information processing device, so that the functions of the present example embodiment may be performed in a software manner.

Figure 1:
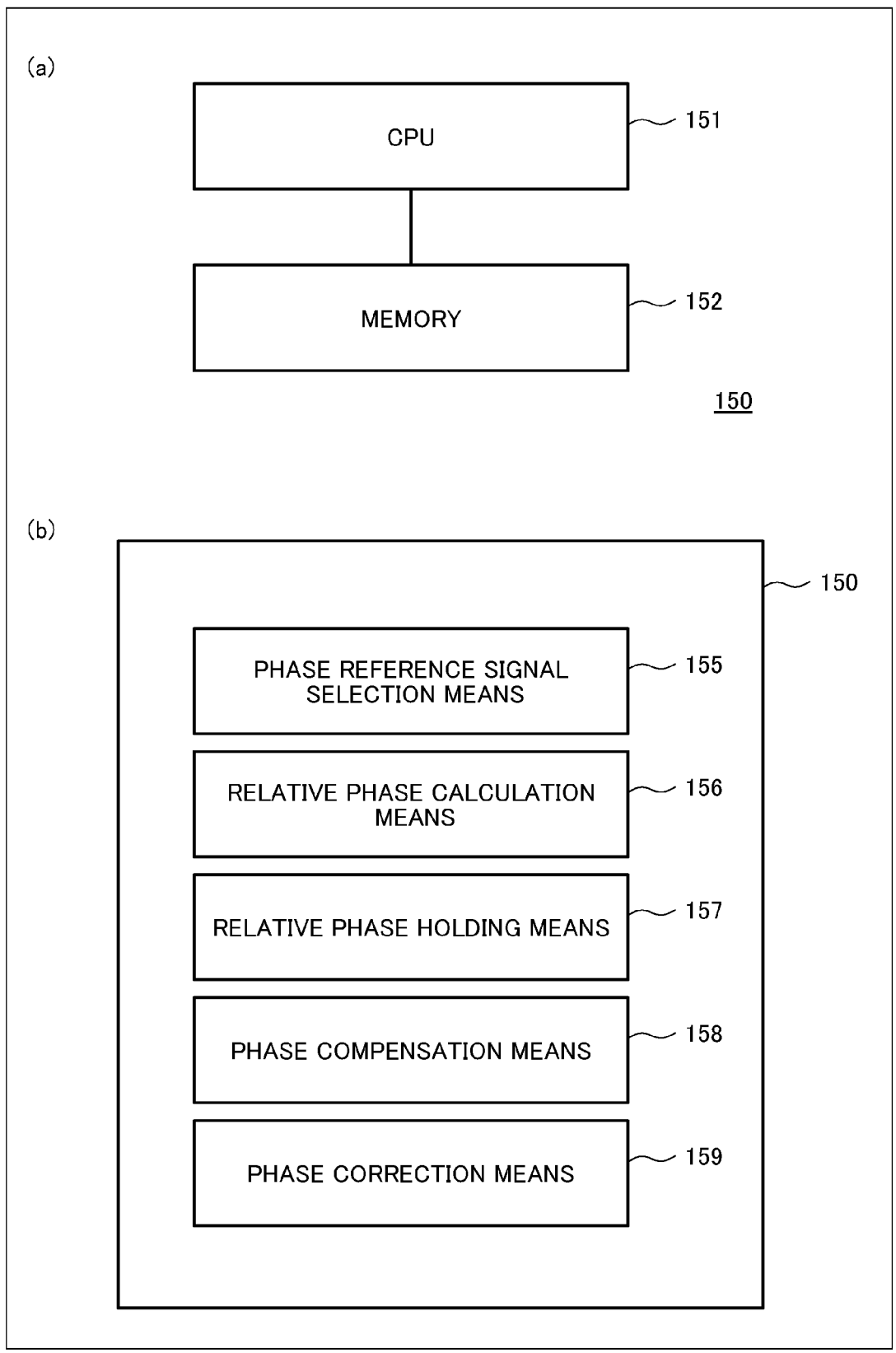

(a) of FIG. 1 is a block diagram of the information processing device that performs signal processing in the diversity type optical space communication receiver of the example embodiment of a superordinate concept of the present invention. (b) of FIG. 1 is a block diagram for explaining elements of the information processing device of (a) of FIG. 1 and illustrating the configuration of the signal processing in the diversity type optical space communication receiver of the example embodiment of the superordinate concept of the present invention. The information processing device 150 of (a) of FIG. 1 includes a central processing unit (CPU) 151 and a memory 152. The information processing device 150 of (b) of FIG. 1 includes a phase reference signal selection means 155, a relative phase calculation means 156, a relative phase holding means 157, a phase compensation means 158, and a phase correction means 159. The information processing device 150 of (a) of FIG. 1 and (b) of FIG. 1 is used for a relative phase compensation process of an optical space communication system that combines and receives a plurality of coherent-detected optical signals by using digital signal processing.

In an aspect, the phase reference signal selection means 155 selects a signal serving as a phase reference, based on the qualities of respective received signals. The relative phase calculation means 156 calculates relative phases between the respective received signals before combining. The relative phase holding means 157 stores the relative phases calculated by the relative phase calculation means 156 as relative phase information. The phase correction means 159 performs phase correction on all the received signals, based on these relative phases. When switching occurs in the selected phase reference signal, a phase correction amount is changed by as much as the relative phase difference between the phase reference signals before and after the switching.

In another aspect, the phase reference signal selection means 155 selects a signal serving as a phase reference, based on the qualities of respective received signals. The relative phase calculation means 156 calculates relative phases between the respective received signals before combining. The relative phase holding means 157 stores the relative phases calculated by the relative phase calculation means 156 as relative phase information. The phase correction means 159 performs correction on a phase compensation amount, which is compensated by the phase compensation means 158, based on these relative phases. When switching occurs in the selected phase reference signal, a phase correction amount is changed by as much as the relative phase difference between the phase reference signals before and after the switching.

That is, a program is used to allow the information processing device 150 to serve as a phase reference signal selection means that selects a phase reference signal serving as a phase reference from a plurality of received signals, based on the qualities of the plurality of received signals, a relative phase calculation means that obtains relative phase information between the plurality of received signals before combining, and a phase correction means that performs phase correction on the received signals, based on the relative phase information. Moreover, when switching occurs in the selected phase reference signal, the information processing device 150 changes a phase correction amount by as much as the relative phase difference between the phase reference signals before and after the switching. The program for performing such functions may be distributed in the form of a recording medium on which the program is recorded. The program may be distributed in the form of a general-purpose semiconductor recording device such as a Compact Flash (CF, Registered Trademark) and a Secure Digital (SD), a magnetic recording medium such as a Flexible Disk, an optical recording medium such as a Compact Disk Read Only Memory (CD-ROM), or the like.

The whole or part of the example embodiments disclosed above can be described as, but not limited to, the following supplementary notes.

(Supplementary note 1) A signal processing device for combining a plurality of received signals to be input comprising: a phase reference signal selection means that selects a signal serving as a phase reference from the plurality of received signals, based on the qualities of the plurality of received signals; a relative phase calculation means that obtains relative phase information between the plurality of received signals before combining; and a phase compensation means that calculates a phase correction amount based on the relative phase information and performs phase correction on the received signals, wherein when switching occurs in the selected phase reference signal, the phase correction amount is changed by as much as a relative phase difference between phase reference signals before and after the switching.

(Supplementary note 2) The signal processing device according to supplementary note 1, further comprising a relative phase holding means that stores the relative phase information between the plurality of received signals before the combining, which is obtained by the relative phase calculation means.

(Supplementary note 3) The signal processing device according to supplementary note 2, further comprising a phase correction value selection means that determines a phase correction value from the relative phase information stored in the relative phase holding means and a change in the signal serving as the phase reference selected by the phase reference signal selection means.

(Supplementary note 4) The signal processing device according to supplementary note 2 or 3, wherein the phase correction means performs phase correction on received signals after the phase compensation means performs relative phase compensation between the received signals.

(Supplementary note 5) The signal processing device according to supplementary note 4, further comprising a maximum ratio combining means that performs weighting based on information on the qualities of the received signals on the received signals after the relative phase compensation between the received signals, and adds the weighted signals.

(Supplementary note 6) The signal processing device according to supplementary note 2 or 3, wherein the phase compensation means compensates for a carrier phase based on a carrier phase estimation result of a phase reference signal simultaneously with the relative phase, and the phase correction means corrects a compensation value of the phase compensation means.

(Supplementary note 7) The signal processing device according to supplementary note 6, further comprising an equalization filter that performs an equalization process on the plurality of received signals and a carrier phase compensation means that performs carrier phase compensation.

(Supplementary note 8) The signal processing device according to supplementary note 7, further comprising a maximum ratio combining means that performs weighting based on information on the qualities of the received signals on the received signals subjected to the equalization process and the carrier phase compensation, and adds the weighted signals.

(Supplementary note 9) A signal processing method for combining a plurality of received signals to be input comprising: selecting a signal serving as a phase reference from the plurality of received signals, based on the qualities of the plurality of received signals; obtaining relative phase information between the plurality of received signals before combining; and calculating a phase correction amount based on the relative phase information and performing phase correction on the received signals, wherein when switching occurs in the selected phase reference signal, the phase correction amount is changed by as much as a relative phase difference between phase reference signals before and after the switching.

(Supplementary note 10) A signal processing program for combining a plurality of received signals to be input, the program causing a computer to serve as: a phase reference signal selection means that selects a phase reference signal serving as a phase reference from the plurality of received signals, based on the qualities of the plurality of received signals; a relative phase calculation means that obtains relative phase information between the plurality of received signals before combining; and a phase compensation means that calculates a phase correction amount based on the relative phase information and performs phase correction on the received signals, wherein
when switching occurs in the selected phase reference signal, the phase correction amount is changed by as much as a relative phase difference between phase reference signals before and after the switching.

(Supplementary note 11) The signal processing program according to supplementary note 10, wherein the signal processing program causes the computer to further serve as a relative phase holding means that stores the relative phase information between the plurality of received signals before the combining, which is obtained by the relative phase calculation means.

So far, the present invention has been described employing the aforementioned example embodiments as exemplary examples. However, the present invention is not limited to the aforementioned example embodiments. That is, the present invention can employ various example embodiments which can be understood by a person skilled in the art within the scope of the present invention.

REFERENCE SIGNS LIST 1, 21 Reception device characteristic compensation unit
2, 22 Relative delay compensation unit
3 Relative phase compensation unit
4, 24 Maximum ratio combining unit
5, 29 Equalization filter
6 Carrier phase compensation unit
7, 27 SNR estimation unit
8, 28 Weighting determination unit
11, 31 Phase reference signal selection unit
12, 32 Relative phase estimation unit
13, 33 Phase correction value selection unit
14, 34 Relative phase holding unit
15, 35 Phase compensation unit
16 Phase correction unit
23 Carrier phase compensation unit
36 Carrier phase estimation unit
37 Phase correction unit
38 Adder

The invention claimed is:

1. A signal processing device for combining a plurality of received signals to be input comprising: a phase reference signal selection unit that selects a signal serving as a phase reference from the plurality of received signals, based on the qualities of the plurality of received signals; a relative phase calculation unit that obtains relative phase information between the plurality of received signals before combining; a phase correction unit that performs relative phase compensation on each of the plurality of received signals on the basis of the relative phase information; and a phase compensation unit that calculates a phase correction amount based on the relative phase information and performs phase correction on the received signals, wherein
when switching occurs in the selected phase reference signal, the phase correction amount is changed by as much as a relative phase difference between phase reference signals before and after the switching.

2. The signal processing device according to claim 1, further including a relative phase holding unit that stores the relative phase information between the plurality of received signals before the combining, which is obtained by the relative phase calculation unit.

3. The signal processing device according to claim 2, further including a phase correction value selection unit that determines a phase correction value from the relative phase information stored in the relative phase holding unit and a change in the signal serving as the phase reference selected by the phase reference signal selection unit.

4. The signal processing device according to claim 2, wherein the phase correction unit performs phase correction on received signals after the phase compensation unit performs relative phase compensation between the received signals.

5. The signal processing device according to claim 4, further including a maximum ratio combining unit that performs weighting based on information on the qualities of the received signals on the received signals after the relative phase compensation between the received signals, and adds the weighted signals.

6. The signal processing device according to claim 2, wherein the phase compensation unit compensates for a carrier phase based on a carrier phase estimation result of a phase reference signal simultaneously with the relative phase, and the phase correction unit corrects a compensation value of the phase compensation unit.

7. The signal processing device according to claim 6, further including an equalization filter that performs an equalization process on the plurality of received signals and a carrier phase compensation unit that performs carrier phase compensation.

8. The signal processing device according to claim 7, further including a maximum ratio combining unit that performs weighting based on information on the qualities of the received signals on the received signals subjected to the equalization process and the carrier phase compensation, and adds the weighted signals.

9. A signal processing method for combining a plurality of received signals to be input comprising: selecting, by a phase reference signal selection unit, a signal serving as a phase reference from the plurality of received signals, based on the qualities of the plurality of received signals; obtaining, by a relative phase calculation unit, relative phase information between the plurality of received signals before combining; and calculating, by a phase compensation unit, a phase correction amount based on the relative phase information and performing phase correction on the received signals, wherein
when switching occurs in the selected phase reference signal, the phase correction amount is changed by as much as a relative phase difference between phase reference signals before and after the switching.

10. A non-transitory commuter readable recording medium for storing a signal processing program for combining a plurality of received signals to be input, the program, when executed by a computer, causing the computer to serve as: a phase reference signal selection unit that selects a phase reference signal serving as a phase reference from the plurality of received signals, based on the qualities of the plurality of received signals; a relative phase calculation unit that obtains relative phase information between the plurality of received signals before combining; and a phase compensation unit that calculates a phase correction amount based on the relative phase information and performs phase correction on the received signals, wherein when switching occurs in the selected phase reference signal, the phase correction amount is changed by as much as a relative phase difference between phase reference signals before and after the switching.

11. The non-transitory commuter readable recording medium for storing a signal processing program according to claim 10, wherein the signal processing program, when executed by the computer, causes the computer to further serve as a relative phase holding unit that stores the relative phase information between the plurality of received signals before the combining, which is obtained by the relative phase calculation unit.

\* \* \* \* \*